United States Patent
Wright

(10) Patent No.: US 12,432,131 B2
(45) Date of Patent: Sep. 30, 2025

(54) AUTOMATIC LOOP TESTING

(71) Applicant: Level 3 Communications, LLC, Broomfield, CO (US)

(72) Inventor: Michael Wright, Basingstoke (GB)

(73) Assignee: Level 3 Communications, LLC, Denver, CO (US)

( * ) Notice: Subject to any disclaimer, the term of this patent is extended or adjusted under 35 U.S.C. 154(b) by 342 days.

(21) Appl. No.: 18/355,746

(22) Filed: Jul. 20, 2023

(65) Prior Publication Data

US 2024/0163196 A1    May 16, 2024

Related U.S. Application Data

(60) Provisional application No. 63/425,867, filed on Nov. 16, 2022.

(51) Int. Cl.
*H04L 43/50*    (2022.01)

(52) U.S. Cl.
CPC .................................. *H04L 43/50* (2013.01)

(58) Field of Classification Search
CPC ..... H04L 43/50; H04L 43/0864; H04L 43/10; H04L 43/0888
See application file for complete search history.

(56) References Cited

U.S. PATENT DOCUMENTS

| | | | |
|---|---|---|---|
| 2017/0085531 A1* | 3/2017 | Song | H04L 63/1425 |
| 2018/0026872 A1* | 1/2018 | Manthiramoorthy | H04L 5/0012 370/249 |
| 2018/0034686 A1* | 2/2018 | Vaidyanathan | H04L 69/16 |

* cited by examiner

*Primary Examiner* — Michael A Keller

(57) ABSTRACT

Novel tools and techniques are provided for implementing automatic loop testing. In various embodiments, a computing system may receive a request to test a network loop; may establish a static route to a target test device that is part of the network loop, the route comprising the network loop to the target test device and back; may execute an automated script to test the network loop, by: sending test data at a first rate to the target test device over the route; and applying a filter to the test data returning from the target test device over the route, the filter being configured to count packets of test data that has propagated over the route and compare with the sent packets of test data, and to drop the test data from continuing to propagate through the network loop; and may present results of the test of the network loop.

20 Claims, 10 Drawing Sheets

AUTOMATIC LOOP TESTING

CROSS-REFERENCES TO RELATED APPLICATIONS

This application claims priority to U.S. Patent Application Ser. No. 63/425,867 (the "'867 Application"), filed Nov. 16, 2022, by Mike Wright, entitled, "Automatic Loop Testing," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network testing, and, more particularly, to methods, systems, and apparatuses for implementing automatic loop testing.

BACKGROUND

To test network services in physical networks, test data may be sent along a physical loop and may be measured to identify errors in the physical networks. However, for modern networks that use logical circuits to connect physical circuits in the networks, and that use network devices that direct network traffic based on Internet Protocol ("IP") addresses or media access control ("MAC") addresses, physical loops are not usable for network testing.

For such modern networks, although RFC 2544 may be used to prove that a correct circuit bandwidth has been provided in layer 2 of the open systems interconnection ("OSI") model, RFC 2544 testing typically requires truck rolls and onsite technicians to implement such testing, and typically does not always test the full path. Although iPerf may be used to perform network performance and tuning for layers 3 to 7 of the OSI model and may be used to prove that the rest of the application layers work as expected, iPerf likewise typically requires truck rolls and onsite technicians to implement such testing as customers may not always be able to support or aid in the testing. RFC 2544 and iPerf also cannot be performed instantly, and may require site visits, downtime, and/or equipment sent to the site, each of which may delay fault resolution and may incur costs (e.g., in terms of service credits, technician or truck roll costs, costs to ship equipment to the site, etc.)

It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

DETAILED DESCRIPTION OF CERTAIN EMBODIMENTS

Overview

Figure 1:
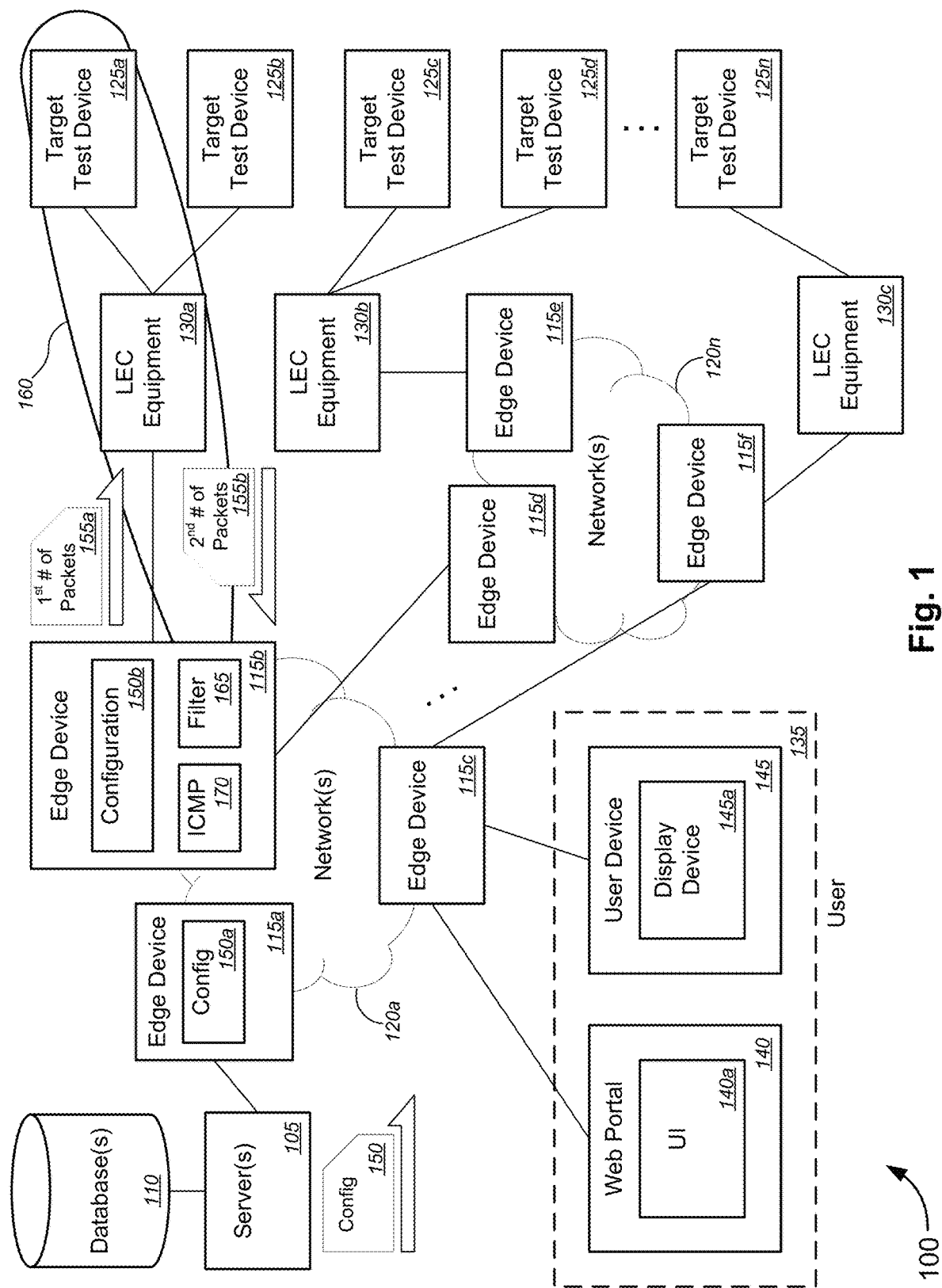
FIG. 1 is a schematic diagram illustrating a system for implementing automatic loop testing, in accordance with various embodiments.

Various embodiments provide tools and techniques for implementing network testing, and, more particularly, to methods, systems, and apparatuses for implementing automatic loop testing.

In various embodiments, a computing system may receive a request to test a first network loop, the request comprising a target identifier ("ID") associated with a target test device that is part of the first network loop; may establish a static route to the target test device based on the received request, the established static route comprising the first network loop from the computing system to the target test device and back to the computing system; may execute an automated script to test the first network loop, wherein the automated script, when executed, causes the computing system to: send first data at a first rate to the target test device over the established static route, the first data comprising a first number of packets of test data; and apply at least one first filter among a plurality of filters to the first data returning from the target test device to the computing system over the established static route, the at least one first filter being configured to count a second number of packets of test data in the first data that has propagated over the established static route, the at least one first filter being further configured to drop the first data from continuing to propagate through the first network loop; and based on a determination that the second number of packets of test data being counted by the at least one first filter is less than the first number of packets of test data being sent in the first data from the computing system to the target test device, may present results of the test of the first network loop.

According to examples, the computing system provides functionalities or features for implementing autonomous testing of modern networks that use logical circuits to connect physical circuits in the networks, and that use network devices that direct network traffic based on Internet Protocol ("IP") addresses or media access control ("MAC") addresses. Unlike RFC 2544 and iPerf that cannot be performed instantly and may require site visits, downtime, and/or equipment sent to the site, each of which may delay fault resolution and may incur costs (e.g., in terms of service credits, technician or truck roll costs, costs to ship equipment to the site, etc.), the network loop tests or automatic loop testing as described herein may be performed instantly or in real-time, and may obviate sending out technicians or equipment, without incurring additional costs. As used herein, "instantly" includes "near instantly," and "real-time" includes "near real-time." In examples, "near instantly" and "near real-time" include, without limitation, within 0.001 seconds, within 0.01 seconds, within 0.1 seconds, within 0.5 seconds, within one second, within one minute, within two minutes, or within 5 minutes, or the like.

These and other aspects of the automatic loop testing are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise receiving, by a computing system, a request to test a first network loop, the request comprising a target identifier ("ID") associated with a target test device that is part of the first network loop; establishing, by the computing system, a static route to the target test device based on the received request, the established static route comprising the first network loop from the computing system to the target test device and back to the computing system; executing, by the computing system, an automated script to test the first network loop, wherein the automated script, when executed, causes the computing system to: send first data at a first rate to the target test device over the established static route, the first data comprising a first number of packets of test data; and apply at least one first filter among a plurality of filters to the first data returning from the target test device to the computing system over the established static route, the at least one first filter being configured to count a second number of packets of test data in the first data that has propagated over the established static route, the at least one first filter being further configured to drop the first data from continuing to propagate through the first network loop; and based on a determination that the second number of packets of test data being counted by the at least one first filter is less than the first number of packets of test data being sent in the first data from the computing system to the target test device, presenting, by the computing system, results of the test of the first network loop.

In some embodiments, the computing system may comprise at least one of a server, a network edge device, or an automated loop testing device, and/or the like.

According to some embodiments, the automated script, when executed, may further cause the computing system to perform at least one of: sending the first data at each of a plurality of rates to the target test device over the established static route; or sending a second data at a second rate to the target test device over the established static route over a first duration, the second data comprising a third number of packets of test data, the first duration being one of predetermined or selectable by a user, the first duration being longer than a duration over which the first data is sent to the target test device.

In some instances, the automated script, when executed, may further cause the computing system to: measure at least one of jitter or latency of the first data propagating over the first network loop using Internet Control Message Protocol ("ICMP").

In some embodiments, the method may further comprise generating a web portal, the web portal comprising a user interface ("UI"), wherein the UI is accessible over a network by a user, wherein receiving the request to test the first network loop may comprise receiving, by the computing system and from the UI, the request to test the first network loop. In some cases, the UI may comprise one or more options that are selectable by the user, wherein the one or more options may comprise at least one of: an option to run the test of the first network loop in background mode; an option to one or more schedule tests of the first network loop; an option to schedule periodic tests of the first network loop; an option to run a test of a second network loop that is different from the first network loop; an option to run the test of the second network loop in background mode; an option to one or more schedule tests of the second network loop; or an option to schedule periodic tests of the second network loop; and/or the like. In some instances, presenting results of the test of the first network loop may comprise at least one of: displaying, by the computing system and within the UI, the results of the test of the first network loop; sending, by the computing system and to a user device associated with the user, a message containing the results of the test of the first network loop; or sending, by the computing system and to the user device associate with the user, a throughput error message; and/or the like. In some cases, the method may further comprise, based on a determination that the second number of packets of test data being counted by the at least one first filter equals the first number of packets of test data being sent in the first data from the computing system to the target test device, performing at least one of: presenting, by the computing system, results of the test of the first network loop; displaying, by the computing system and within the UI, the results of the test of the first network loop; sending, by the computing system and to a user device associated with the user, a message containing the results of the test of the first network loop; or presenting, by the computing system and within the UI, a message indicating that service throughput characteristics of network services being provided via the target test device match service throughput characteristics of network services as ordered by a customer with which the target test device is associated; and/or the like.

According to some embodiments, the computing system may comprise a remote edge device, wherein the first data may be generated by a test server. In such a case, the method may further comprise: autonomously applying, by the test server, at least one first configuration among one or more configurations, which have been autonomously built, to a local edge device that is an edge device between the test server and the remote edge device, the at least one first configuration causing the local edge device to perform one or more first tasks; and autonomously applying, by the test server, at least one second configuration among the one or more configurations to the remote edge device, the at least one second configuration causing the remote edge device to perform one or more second tasks. In some cases, the method may further comprise establishing a communications link between the remote edge device and the local edge device. In such cases, the communications link may comprise a multiprotocol label switching ("MPLS") routing link. In some instances, each of the one or more first tasks and the one or more second tasks may comprise at least one of: running tests on one of the local edge device or the remote edge device; running tests of network loops communicatively coupled to at least one of the local edge device or the remote edge device; determining whether a hop from one network segment to another network segment between the test server and the remote edge device is reachable, unreachable, or obstructed; determining whether a hop from one network segment to another network segment along the first network loop is reachable, unreachable, or obstructed; or determining which one or more filters among the plurality of filters to apply to the first data; and/or the like. In some cases, the method may further comprise, after testing the first network loop, removing the at least one first configuration from the local edge device and removing the at least one second configuration from the remote edge device.

In some embodiments, the test data may comprise a packet capture ("pcap") data file. In such cases, sending the first data may comprise sending a first number of packets of the pcap data file at the first rate to the target test device over the established static route using user datagram protocol ("UDP").

Alternatively, the test data may comprise a packet capture ("pcap") data file of a transmission control protocol ("TCP") data stream. In such cases, sending the first data may comprise sending a first number of packets of the pcap data file of the TCP data stream at the first rate to the target test device over the established static route.

According to some embodiments, the target test device may comprise a customer premises equipment ("CPE"). In such cases, the established static route may further comprise one or more local exchange carrier ("LEC") equipment along the first network loop. In some instances, in response to being initialized, the CPE may send, to the computing system, the request to test the first network loop. In such cases, presenting the results of the test of the first network loop may comprise presenting, by the computing system and to a user interface ("UI") of one of a web portal accessible to a user or a user device associated with the user, results of the test of the first network loop.

In another aspect, a system may comprise a computing system, which may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: receive a request to test a first network loop, the request comprising a target identifier ("ID") associated with a target test device that is part of the first network loop; establish a static route to the target test device based on the received request, the established static route comprising the first network loop from the computing system to the target test device and back to the computing system; execute an automated script to test the first network loop, wherein the automated script, when executed, causes the computing system to: send first data at a first rate to the target test device over the established static route, the first data comprising a first number of packets of test data; and apply at least one first filter among a plurality of filters to the first data returning from the target test device to the computing system over the established static route, the at least one first filter being configured to count a second number of packets of test data in the first data that has propagated over the established static route, the at least one first filter being further configured to drop the first data from continuing to propagate through the first network loop; and based on a determination that the second number of packets of test data being counted by the at least one first filter is less than the first number of packets of test data being sent in the first data from the computing system to the target test device, present results of the test of the first network loop.

According to some embodiments, the computing system may comprise at least one of a server, a network edge device, or an automated loop testing device, and/or the like.

In yet another aspect, a method may comprise receiving, by a test server or a remote edge device and from one of a target test device or a user via a user interface ("UI"), a request to test a first network loop, the request comprising a target identifier ("ID") associated with a target test device that is part of the first network loop; autonomously applying, by a test server, at least one first configuration among one or more configurations, which have been autonomously built, to a local edge device that is an edge device between the test server and the remote edge device, the at least one first configuration causing the local edge device to perform one or more first tasks; autonomously applying, by the test server, at least one second configuration among the one or more configurations to the remote edge device, the at least one second configuration causing the remote edge device to perform one or more second tasks; establishing, by the test server or the remote edge device, a static route to the target test device based on the received request, the established static route comprising the first network loop from the remote edge device to the target test device and back to the remote edge device; executing, by the test server or the remote edge device, an automated script to test the first network loop, wherein the automated script, when executed, causes the test server or the remote edge device to: send first data at a first rate to the target test device over the established static route, the first data comprising a first number of packets of test data; and apply at least one first filter among a plurality of filters to the first data returning from the target test device to the remote edge device over the established static route, the at least one first filter being configured to count a second number of packets of test data in the first data that has propagated over the established static route, the at least one first filter being further configured to drop the first data from continuing to propagate through the first network loop; and based on a determination that the second number of packets of test data being counted by the at least one first filter is less than the first number of packets of test data being sent in the first data from the remote edge device to the target test device, presenting, by the test server or the remote edge device and to the user via the UI, results of the test of the first network loop.

In some embodiments, each of the one or more first tasks and the one or more second tasks may comprise at least one of: running tests on one of the local edge device or the remote edge device; running tests of network loops communicatively coupled to at least one of the local edge device or the remote edge device; determining whether a hop from one network segment to another network segment between the test server and the remote edge device is reachable, unreachable, or obstructed; determining whether a hop from one network segment to another network segment along the first network loop is reachable, unreachable, or obstructed; or determining which one or more filters among the plurality of filters to apply to the first data; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-5 illustrate some of the features of the method, system, and apparatus for implementing network testing, and, more particularly, to methods, systems, and apparatuses for implementing automatic loop testing, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing automatic loop testing, in accordance with various embodiments.

In the non-limiting embodiment of FIG. 1, system 100 may include, without limitation, at least one of a server(s) or test server(s) 105, a database(s) 110, a plurality of edge devices or network edge devices 115a-115f (collectively, "edge devices 115" or the like), a plurality of network(s) 120a-120n (collectively, "networks 120" or the like), a plurality of target test devices 125a-125n (collectively, "target test devices 125" or the like), or a plurality of local exchange carrier ("LEC") equipment 130a-130c (collectively, "LEC equipment 130" or the like), and/or the like. Although six edge devices 115 and three LEC equipment 130 are shown in FIG. 1, the various embodiments are not so limited, and any suitable number of edge devices 115 and LEC equipment 130 may be used or deployed within the system 100 to handle regular network operations as well as for use in implementing automatic loop testing.

System 100 may further comprise a web portal 140 that is accessible by a user 135 and/or a user device 145 that is associated with, or otherwise used by, the user 135. The user device 145 may include, without limitation, a display device 145a, or the like, while the web portal 140 may include, but is not limited to, a user interface ("UI") 140a, or the like. The user 135—who may include, without limitation, technicians who add, remove, or test network devices and/or people who need access to such network devices, as listed or identified by network operations center ("NOC") managers, or the like—may utilize the UI 140a of the web portal 140 and/or the user device 145 to request testing of network loops and/or to view results of tests of network loops, and/or the like. In some instances, user device 145 may include, but is not limited to, one of a desktop computer, a laptop computer, a tablet computer, a smart phone, a mobile phone, a NOC computing system or console, or any suitable device capable of communicating with server(s) 105 and/or one or more edge devices 115) via a web-based portal (e.g., web portal 140, or the like), an application programming interface ("API"), a server, a software application ("app"), or any other suitable communications interface, or the like, over network(s) 120a-120n.

Herein, "testing of network loops" or "network loop tests" may refer to testing of parameters, characteristics, and/or performance of layer 3 components, equipment, or devices corresponding to the network layer of the open systems interconnection ("OSI") model. In some cases, the network loop tests or automatic loop testing as described herein may be similar to a layer 3 version of the RFC 2544 test, which is used to test layer 2 performance. As described herein, the network loop tests or automatic loop testing may utilize either user datagram protocol ("UDP") or transmission control protocol ("TCP") to send data packets at a set rate from an edge device 115 to a target test device 125, which returns the data back to the edge device 115, which may utilize a filter to count, may then drop the data packets, and may then compare the number of packets counted with the number of packets sent. Although RFC 2544 may be used to prove that the correct circuit (layer 2) bandwidth has been provided, RFC 2544 testing typically requires truck rolls and onsite technicians to implement such testing, and typically does not always test the full path. Although iPerf may be used to perform network performance and tuning for layers 3 to 7 of the OSI model and may be used to prove that the rest of the application layers work as expected, iPerf likewise typically requires truck rolls and onsite technicians to implement such testing as customers may not always be able to support or aid in the testing. Unlike the network loop tests or automatic loop testing as described herein, RFC 2544 and iPerf cannot be performed instantly, and may require site visits, downtime, and/or equipment sent to the site, each of which may delay fault resolution and may incur costs (e.g., in terms of service credits, technician or truck roll costs, costs to ship equipment to the site, etc.).

In some instances, at least one of the server(s) 105, the database(s) 110, and/or each of the plurality of edge devices 115a-115n may each be disposed within a network among the one or more networks 120a-120n. In some cases, the networks 120 and components thereof may be owned and/or operated by a first network service provider, while the LEC equipment 130 may be owned and/or operated by one or more second network service providers. In some instances, the first network service provider may be the same as one of the one or more second network service providers, while in other cases, the first network service provider may be different from each of the one or more second network service providers. In some cases, the LEC equipment 130 may include network equipment that connect or communicatively couple one or more target test devices 125 among the plurality of target test devices 125a-125n to edge devices 115 that are disposed in network(s) 120. In some embodiments, each of the plurality of target test devices 125a-125n may include, without limitation, at least one of a customer premises equipment ("CPE"), a switch, a router, a network gateway, a network firewall, a server, a network node, or other network device, and/or the like.

According to some embodiments, network(s) 120a-120n may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 120a-120n may include an access network of the service provider (e.g., an Internet service provider ("ISP")). In another embodiment, the network(s) 120a-120n may include a core network of the service provider and/or the Internet.

In operation, server(s) 105 and/or edge device 115 (collectively, "computing system" or the like) may receive a request to test a first network loop, the request comprising a target identifier ("ID") associated with a target test device (in this case, target test device 125a) that is part of the first network loop. The computing system may establish a static route to the target test device based on the received request, the established static route (in this case, route 160, or the like) including the first network loop from the computing system to the target test device and back to the computing system. The computing system may execute an automated script to test the first network loop. The computing system may present the results of the test of the first network loop to the user 135, in some cases, via the UI 140a of the web portal 140 and/or via the display device 145a of user device 145, or the like.

According to some embodiments, the automated script, when executed, may cause the computing system to perform at least one of: sending first data at a first rate to the target test device 125a over the established static route 160, the first data comprising a first number of packets 155a of test data 155; sending the first data 155 at each of a plurality of rates to the target test device over the established static route 160; and/or sending a second data at a second rate to the target test device 125a over the established static route 160 over a first duration, the second data comprising a third number of packets of test data, the first duration being one of predetermined or selectable by a user, the first duration being longer than a duration over which the first data is sent to the target test device; and/or the like. In some instances, the automated script, when executed, may further cause the computing system to apply at least one first filter 165 among a plurality of filters to the first data returning from the target test device 125a to the computing system over the established static route, the at least one first filter being configured to count a second number of packets 155b of test data 155 in the first data that has propagated over the established static route 160, the at least one first filter 165 being further configured to drop (or to otherwise prevent) the first data from continuing to propagate through the first network loop. Alternatively, or additionally, the automated script, when executed, may further cause the computing system to measure at least one of jitter or latency of the first data propagating over the first network loop using Internet Control Message Protocol ("ICMP") 170.

In some embodiments, server(s) 105 and/or some other computing system or device may autonomously build one or more configurations. The server(s) 105 may autonomously apply at least one first configuration 150a among the one or more configurations 150 to a local edge device (in this case, edge device 115a, or the like) that is an edge device that is disposed between the server(s) 105 and a remote edge device (in this case, edge device 115b, or the like), the at least one first configuration 150a causing the local edge device 115a to perform one or more first tasks. The server(s) 105 may autonomously apply at least one second configuration 150b among the one or more configurations 150 to the remote edge device 115b, the at least one second configuration 115b causing the remote edge device 115b to perform one or more second tasks. In some instances, each of the one or more first tasks and the one or more second tasks may include, but is not limited to, at least one of: running tests on one of the local edge device or the remote edge device; running tests of network loops communicatively coupled to at least one of the local edge device or the remote edge device; determining whether a hop from one network segment to another network segment between the test server and the remote edge device is reachable, unreachable, or obstructed; determining whether a hop from one network segment to another network segment along the first network loop is reachable, unreachable, or obstructed; or determining which one or more filters among the plurality of filters to apply to the first data; and/or the like. The server(s) 105, after testing the first network loop, may remove the at least one first configuration 150a from the local edge device 115a and may remove the at least one second configuration 150b from the remote edge device 115b.

According to some embodiments, the target test device may include a CPE. In such cases, the established static route may further include one or more LEC equipment (e.g., LEC equipment 130a) along the first network loop. In some instances, in response to being initialized, the CPE may send, to the computing system, the request to test the first network loop. In such cases, presenting the results of the test of the first network loop may comprise presenting, by the computing system and to a UI of one of a web portal accessible to a user or a user device associated with the user, results of the test of the first network loop.

In some embodiments, the test data 155 may include, without limitation, a packet capture ("pcap") data file, or the like. In such cases, sending the first data may comprise sending a first number of packets of the pcap data file (e.g., of the TCP data stream) at the first rate to the target test device over the established static route using UDP. Alternatively, the test data may include, but is not limited to, a pcap data file of a TCP data stream. According to some embodiments, the pcap file of actual TCP streams may be created at set rates and window sizes. Using the same loop methodology used for UDP as described above, the equivalent of a simultaneous bidirectional TCP test may be created. This would then test buffers along the network path in both directions in addition to the subscribed rate test. Ordinarily, TCP requires a server and a client, and with two-way communication, but the various embodiments may simply require a sink hole (e.g., the filter) for the data packets. Acknowledgment ("ACK") packets would not be required in this case.

In some aspects, the server(s) 105 or the remote edge device 115b may receive, from one of a target test device (e.g., target test device 125a, or the like) or a user via a UI (e.g., user 135 via UI 140a, or the like), a request to test a first network loop, the request comprising a target identifier ("ID") associated with a target test device that is part of the first network loop. The server(s) 105 may autonomously apply at least one first configuration among one or more configurations, which have been autonomously built, to a local edge device (e.g., edge device 115a, or the like) that is an edge device between the test server and the remote edge device, the at least one first configuration causing the local edge device to perform one or more first tasks; and may autonomously apply at least one second configuration among the one or more configurations to the remote edge device, the at least one second configuration causing the remote edge device to perform one or more second tasks. The server(s) 105 or the remote edge device 115b may establish a static route to the target test device based on the received request, the established static route comprising the first network loop from the remote edge device to the target test device and back to the remote edge device; may execute an automated script to test the first network loop, wherein the automated script, when executed, causes the server(s) 105 or the remote edge device 115b to: send first data at a first rate to the target test device over the established static route, the first data comprising a first number of packets of test data; and apply at least one first filter among a plurality of filters to the first data returning from the target test device to the remote edge device over the established static route, the at least one first filter being configured to count a second number of packets of test data in the first data that has propagated over the established static route, the at least one first filter being further configured to drop the first data from continuing to propagate through the first network loop; and based on a determination that the second number of packets of test data being counted by the at least one first filter is less than the first number of packets of test data being sent in the first data from the remote edge device to the target test device, presenting, by the server(s) 105 or the remote edge device 115b may and to the user via the UI, results of the test of the first network loop.

These and other functions of the system 100 (and its components) are described in greater detail below with respect to FIGS. 2-4.

Figure 2:
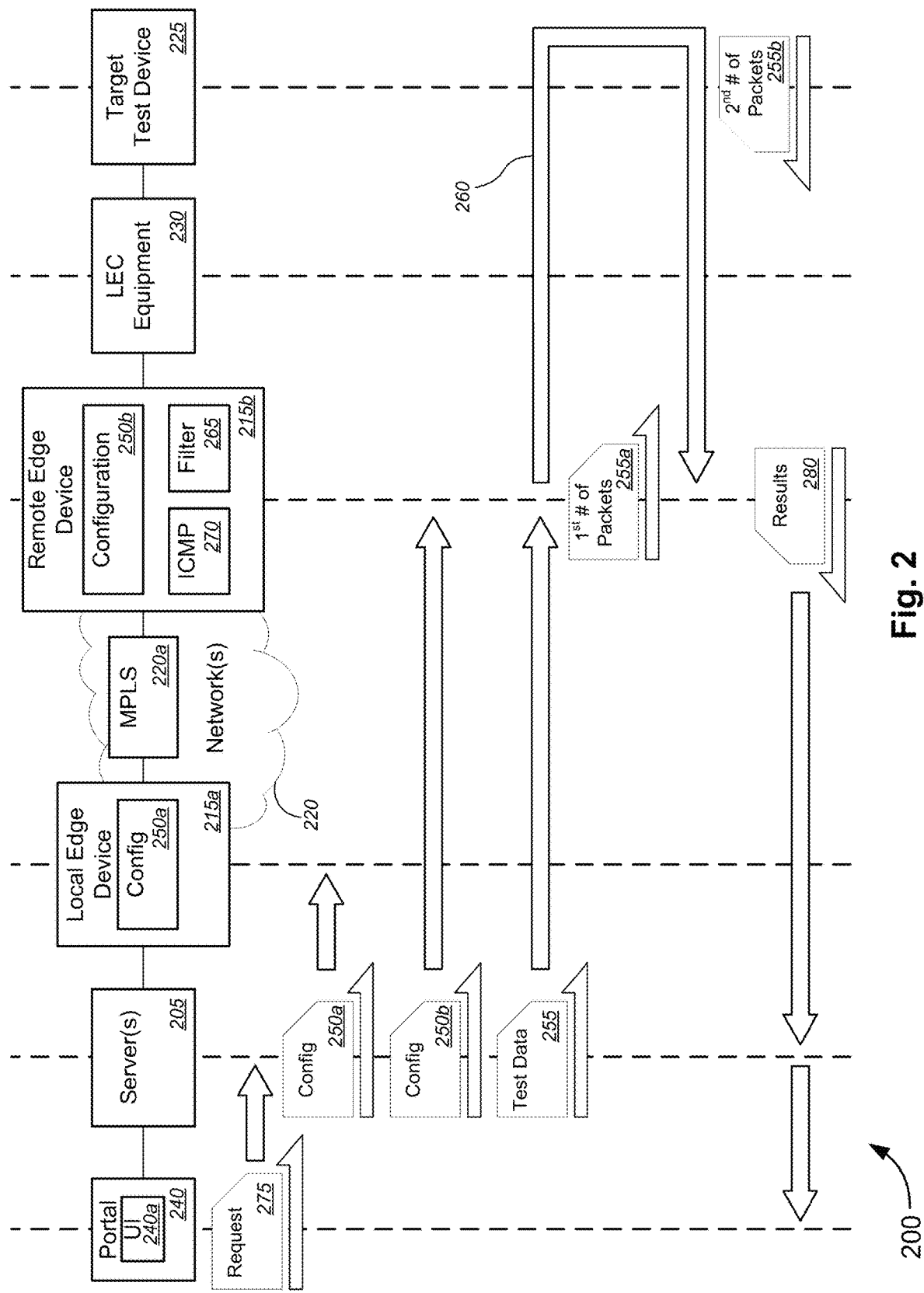
FIG. 2 is a diagram illustrating a non-limiting example of interactions among components within a system for implementing automatic loop testing, in accordance with various embodiments.

FIG. 2 is a diagram illustrating a non-limiting example 200 of interactions among components within a system for implementing automatic loop testing, in accordance with various embodiments.

In the non-limiting example 200 of FIG. 2, server(s) 205 may communicatively couple with local edge device 215a, and, in some cases, may establish (or may request that another network device establish) a communication link between local edge device 215a and remote edge device 215b over network(s) 220, in some cases, using multiprotocol label switching ("MPLS") routing 220a, or the like.

In operation, a user, using a UI 240a of a portal 240 or the like, may send a request 275 to test a first network loop 260, the request comprising a target identifier ("ID") associated with a target test device 225 that is part of the first network loop 260. The server(s) 205 may receive the request 275, and, in some cases, may relay the request 275 to local edge device 215a and/or remote edge device 215b (which is closest network device in network(s) 220 to the target test device 225). In response to receiving the request 275, the server(s) 205 may autonomously apply at least one first configuration 250a among one or more configurations 250, which have been autonomously built, to local edge device 215a, the at least one first configuration 250a causing the local edge device 215a to perform one or more first tasks; and may autonomously apply at least one second configuration 250b among the one or more configurations 250 to remote edge device 215b, the at least one second configuration 250b causing the remote edge device 215b to perform one or more second tasks. Server(s) 205 and/or remote edge device 215b may establish a static route 260 to the target test device 225 based on the received request 275, the established static route 260 comprising the first network loop 260 from the remote edge device 215b to the target test device 225 and back to the remote edge device 215b; and may execute an automated script to test the first network loop 260. The automated script, when executed, may cause the server(s) 205 or the remote edge device 215b to: send first data at a first rate to the target test device over the established static route, the first data comprising a first number of packets 255a of test data 255, which may be generated and/or sent by server(s) 205 or the like; and may apply at least one first filter 265 among a plurality of filters to the first data returning from the target test device 225 to the remote edge device 215b over the established static route 260, the at least one first filter being configured to count a second number of packets 255b of test data 255 in the first data that has propagated over the established static route 260, the at least one first filter 265 being further configured to drop the first data 255 from continuing to propagate through the first network loop 260. Whether based on a determination that the second number of packets 255b of test data 255 being counted by the at least one first filter 265 is less than the first number of packets 255a of test data 255 being sent in the first data from the remote edge device 215b to the target test device 255 or whether based on a determination that the second number of packets 255b of test data 255 being counted by the at least one first filter 265 equals the first number of packets 255a of test data 255 being sent in the first data from the remote edge device 215b to the target test device 255, the server(s) 205 or the remote edge device 215b may relay and/or present, to the user via the UI 240a, results 280 of the test of the first network loop. In some instances, the automated script, when executed, may further cause the server(s) 205 or the remote edge device 215b to: measure at least one of jitter or latency of the first data propagating over the first network loop 260 using Internet Control Message Protocol ("ICMP"). In such a case, results 280 may include results of such measurement.

In some embodiments, each of the one or more first tasks and the one or more second tasks may include, without limitation, at least one of: running tests on one of the local edge device or the remote edge device; running tests of network loops communicatively coupled to at least one of the local edge device or the remote edge device; determining whether a hop from one network segment to another network segment between the test server and the remote edge device is reachable, unreachable, or obstructed; determining whether a hop from one network segment to another network segment along the first network loop is reachable, unreachable, or obstructed; or determining which one or more filters among the plurality of filters to apply to the first data; and/or the like.

According to some embodiments, the target test device 225 may include a CPE. In such cases, the established static route 260 may further include one or more LEC equipment 230 along the first network loop 260. In some instances, in response to being initialized, the CPE may send, to server(s) 205 and/or remote edge device 215b, the request to test the first network loop. In such cases, presenting the results of the test of the first network loop may comprise presenting, to UI 240a of portal 240, results of the test of the first network loop.

In some embodiments, server(s) 205, local edge device 215a, remote edge device 215b, network(s) 220, target test device 225, LEC equipment 230, portal 240, UI 240a, configurations 250a and 250b, test data 255, first number of packets 255a, second number of packets 255b, and network loop or static route 260 of FIG. 2 may be similar, if not identical, to server(s) 105, edge device 115a, edge device 115b, network(s) 120a-120n, target test device 125a-125n, LEC equipment 130, portal 140, UI 140a, configurations 150a and 150b, test data 155, first number of packets 155a, second number of packets 155b, and network loop or static route 160, respectively, of system 100 of FIG. 1, and the description of these components of system 100 of FIG. 1 are similarly applicable to the corresponding components of FIG. 2.

These and other functions of the example 200 (and its components) are described in greater detail herein with respect to FIGS. 1, 3, and 4.

Figure 3A:
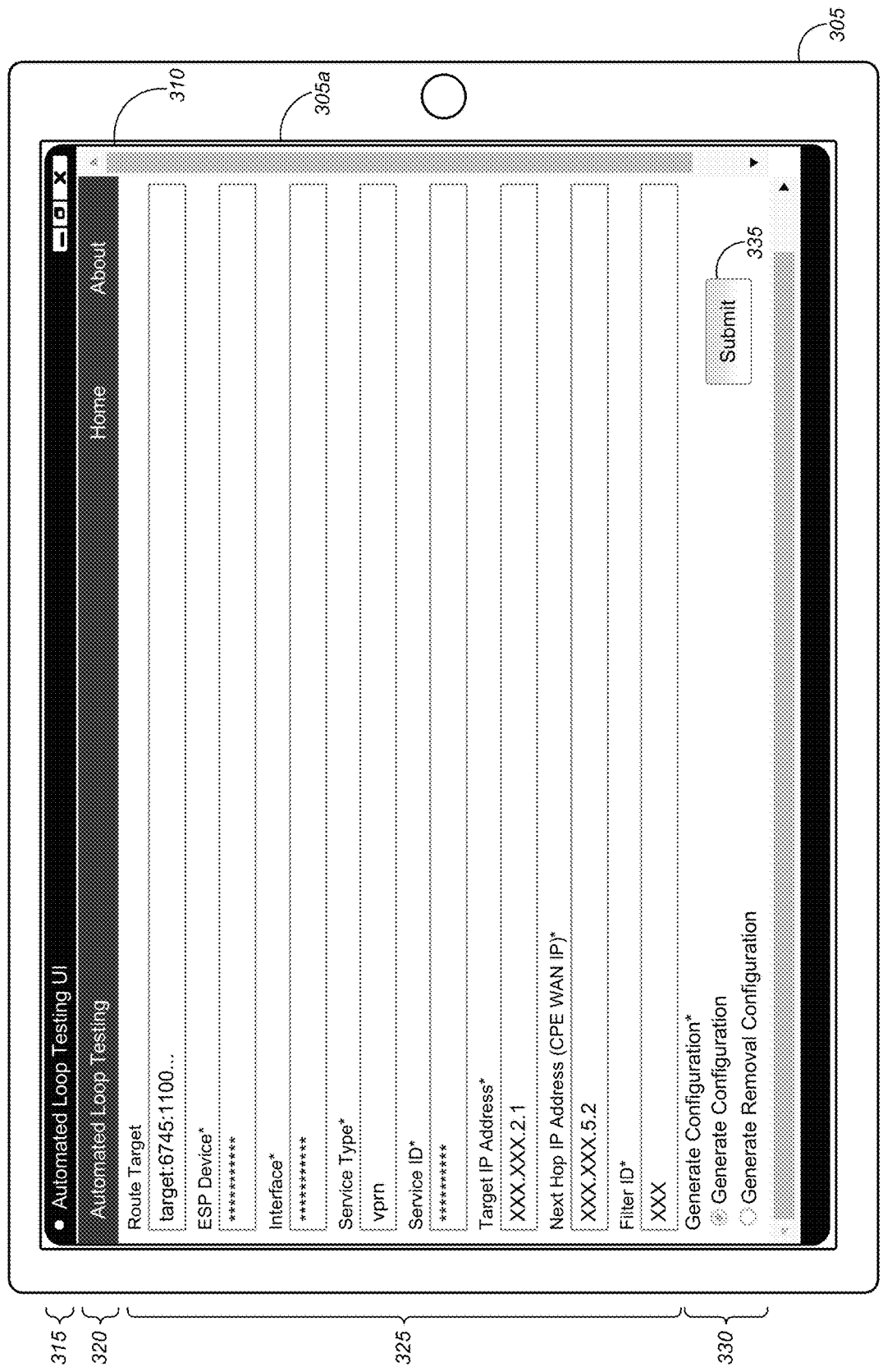
FIGS. 3A-3C are diagrams illustrating various non-limiting examples of a user interface(s) for a web portal that may be used when implementing automatic loop testing, in accordance with various embodiments.
Figure 3B:
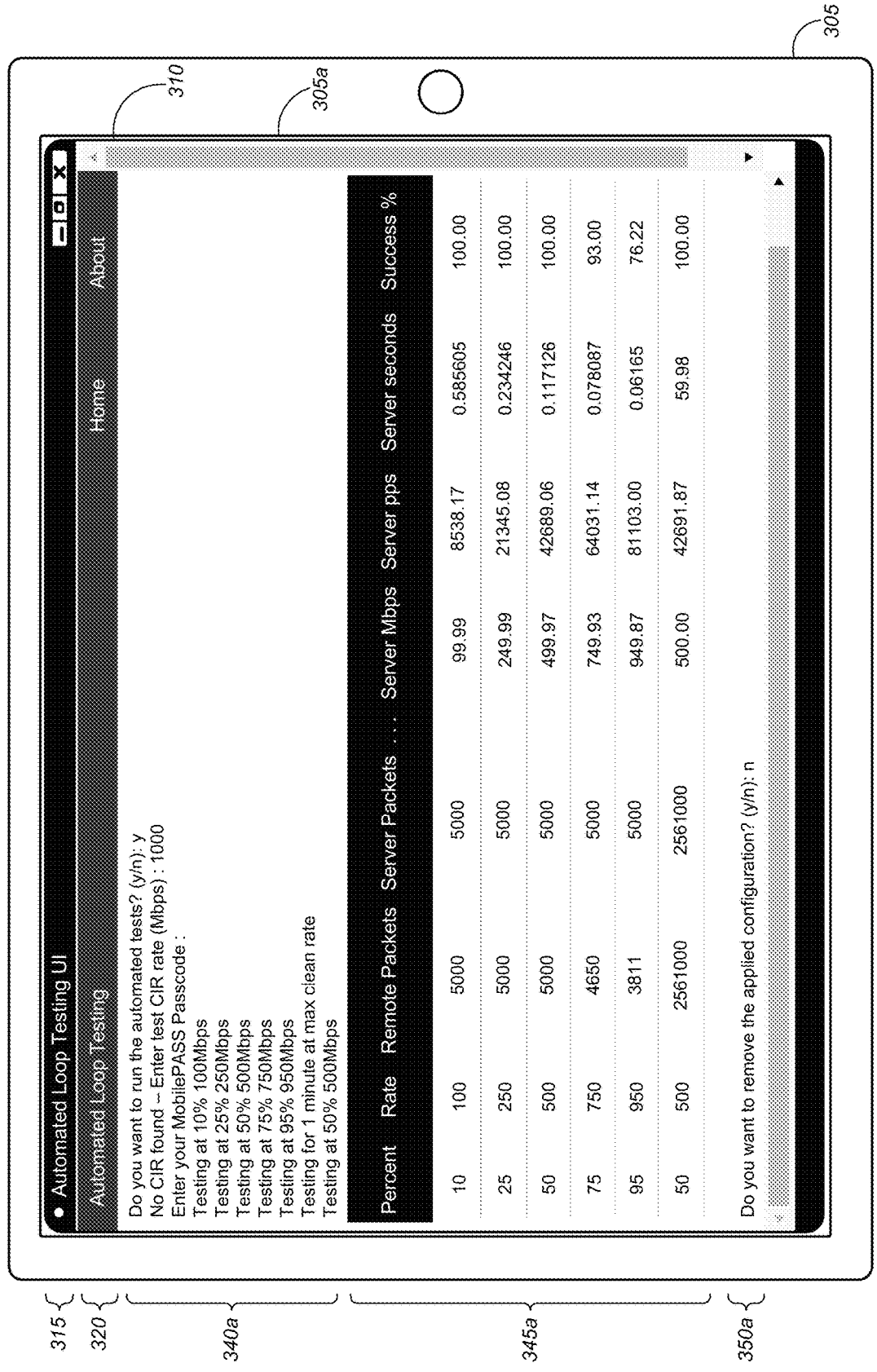
Figure 3C:
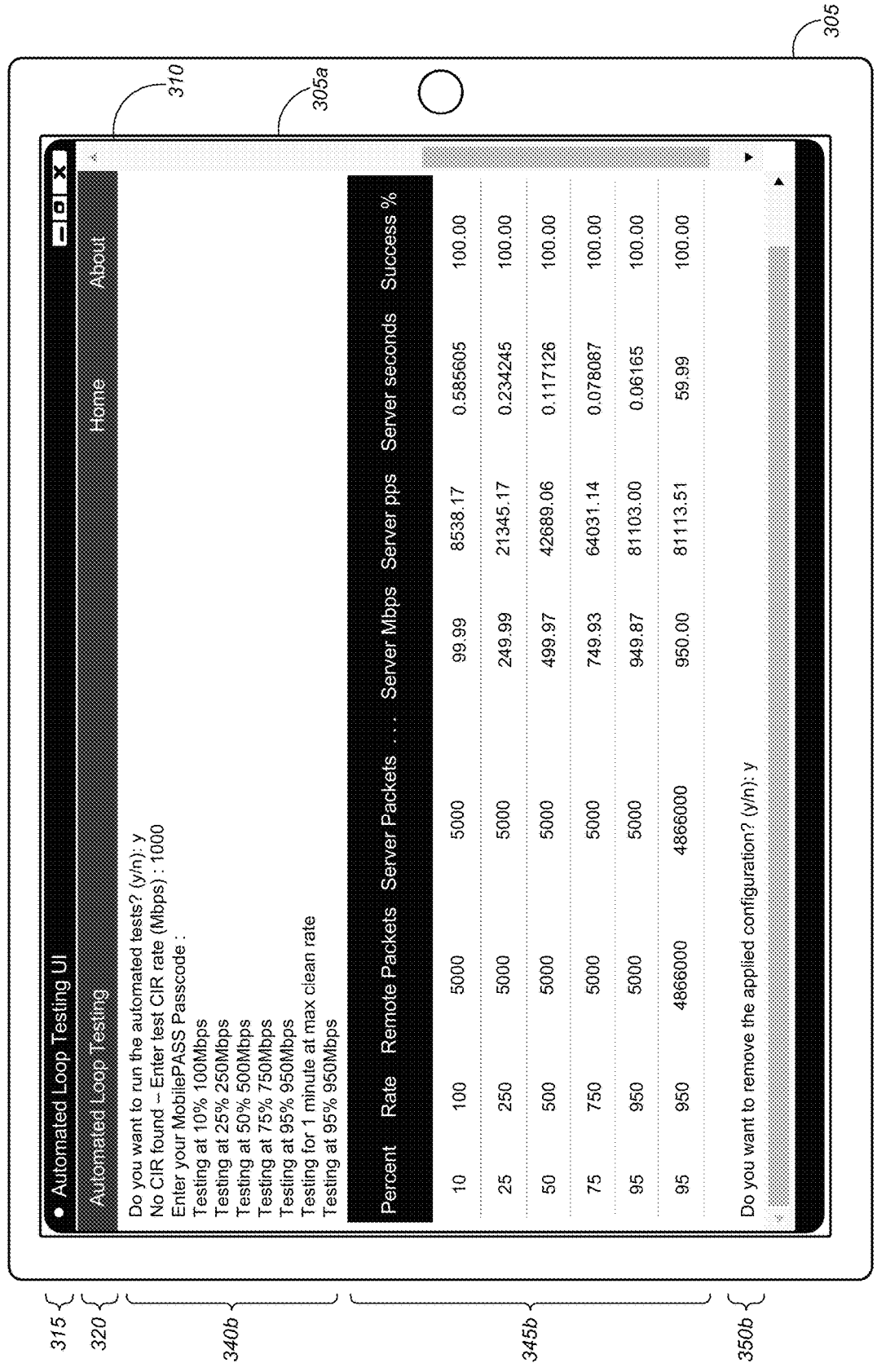

FIGS. 3A-3C (collectively, "FIG. 3") are diagrams illustrating various non-limiting examples 310 of a user interface(s) for a web portal that may be used when implementing automatic loop testing, in accordance with various embodiments.

The embodiment as represented in FIG. 3 is merely illustrative and is not intended to limit the scope of the various embodiments. For example, although a tablet computer is shown as the user device 300, any suitable user device—including, but not limited to, user device 145, which may each include, but is not limited to, one of a desktop computer, a laptop computer, a tablet computer, a smart phone, a mobile phone, a NOC computing system or console, or any suitable device capable of communicating with server(s) 105 and/or one or more edge devices 115) via a web-based portal (e.g., web portal 140, or the like), an API, a server, an app, or any other suitable communications interface, or the like, over network(s) 120a-120n, and the like—may be used.

As shown in the embodiment of FIG. 3, user device 300 may comprise a device housing 305 and a display 305a (which may be a touchscreen display or a non-touchscreen display). An app, an application window, program window or portal (e.g., web portal or the like) may be displayed on the display 305a. In the non-limiting example of FIG. 3, the app or portal 310 running on the user device 300 is a user interface illustrating an automated loop testing UI (in some cases, including "automated loop testing UI" or "loop testing UI" or the like), although the various embodiments are not limited to such an app or portal, as described herein, and can be any suitable app or portal. The app or portal 310 displayed in display 305a may provide a user (e.g., a technician, a telephone agent, a web-based agent, a chat agent, or other representative, etc. of the service provider, and/or the user as described above with respect to FIG. 1, or the like) with the ability, functionality, or options to request testing of network loops and/or to view results of tests of network loops, or to implement any other suitable functionality of the automated loop testing UI (such as described herein in detail with respect to FIGS. 1, 2, and 4, or the like), and/or the like. Herein, FIG. 3A is directed to the form for requesting the testing of a network loop, while FIGS. 3B and 3C are directed to implementation and/or display of results of the requested network loop testing, for example, although not limited to such.

As shown in the non-limiting example of FIG. 3A, the app or portal 310 may include, without limitation, at least one of a header portion 315 (e.g., indicating the app or portal site as "Automated Loop Testing UI" or the like), a title portion 320 (e.g., indicating the functionality(ies) being offered by the automated loop testing UI, in this case, "Automated Loop Testing" or the like), a request data fields portion 325 [including one or more entry fields for entering information for a route target (e.g., the route target of the test virtual routing and forwarding ("VRF"), or the like), for an edge services platform ("ESP") or edge device, for an interface, for a service type (e.g., "VPN" or "VPRN" or the like), for a service ID, for a target IP address, for a next hop IP address, for a filter ID, and/or the like], a configuration generation portion 330 [including one or more radio buttons or other selectable fields (including for selecting between "Yes" and "No" for selecting to generate a configuration or to generate a removal configuration, etc.], or one or more virtual buttons or options 335 (e.g., for submitting the request, or the like), and/or the like.

Herein, "X" and "*" in FIG. 3 represents redacted information, for the purposes of simplicity of illustration in this patent document, but would be visible to a user during regular use of the automated loop testing UI (unless otherwise indicated).

As shown in the non-limiting examples of FIGS. 3B and 3C, the app or portal 310 may further include, without limitation, at least one of an automated loop testing request and status portion 340a or 340b [including, but not limited to, one or more entry fields for confirming desire to run the automated tests, for entering a test committed information rate ("CIR") or bandwidth for a virtual circuit, for entering a passcode to authenticate the user, and/or the like], a results portion 345a or 345b [including, but not limited to, a display field for displaying percentage of the entered CIR or bandwidth, the resultant rate based on the percentage, the number of packets in the test data as counted by the remote edge device by the filter (as described above with respect to FIGS. 1 and 2, or the like), the number of packets being sent in the test data from the server, the actual or measured bandwidth as measured at the server, the actual or measured packets per second data rate as measured at the server, the time in seconds for sending the packets of the test data as measured at the server, and the success in terms of percentage of packets transmitted over the network loop (e.g., transmitted versus lost packets, etc.), and/or the like], and a configuration removal query portion 350a or 350b.

As shown in the non-limiting examples of FIGS. 3B and 3C, for an automated loop test with a test rate of 1000 Mbps (in these non-limiting examples), testing may be performed (assuming the user has entered a valid and authenticated passcode), e.g., by testing at a set of rates based on the percentage of the test rate of 1000 Mbps (e.g., at 10% (or 100 Mbps), 25% (or 250 Mbps), 50% (or 500 Mbps), 75% (or 750 Mbps), 95% (950 Mbps), etc.), then testing for a set duration (e.g., 1 minute) at the maximum clean rate (i.e., the maximum rate at which the test packets were successfully transmitted over the network loop). In the example of FIG. 3B, as shown in results portion 345a, packet loss occurred above 500 Mbps (with 100% success rate for 100 Mbps, 250 Mbps, and 500 Mbps, with 93.00% success rate for 750 Mbps, and with 76.22% for 950 Mbps, etc.), which results in a max clean rate in this case of 500 Mbps (with 2561000 packets being sent over 59.98 seconds). As also shown in results portion 345*a*, at the max clean rate of 500 Mbps being sent over a duration of about 1 minute, a success rate of 100% was achieved in this case. As the max clean rate (in this case, 500 Mbps) is less than the test rate of 1000 Mbps, the user may desire not to remove the applied configuration until the network loop has been repaired (as shown, e.g., in configuration removal query portion 350*a*, or the like). After repairing the network loop (e.g., by repairing a damaged or an incorrectly set policer, which may be used to network traffic flow, etc.), in the example of FIG. 3C, as shown in results portion 345*b*, 100% success rate may be achieved for 100 Mbps, 250 Mbps, 500 Mbps, 750 Mbps, and 950 Mbps, etc., which results in a max clean rate in this case of 950 Mbps (with 4866000 packets being sent over 59.99 seconds). As also shown in results portion 345*b*, at the max clean rate of 950 Mbps being sent over a duration of about 1 minute, a success rate of 100% was achieved in this case. With the fully successful test, the user may desire to remove the applied configuration after testing (as shown, e.g., in configuration removal query portion 350*b*, or the like).

These and other functions of the examples 310 (and their components) are described in greater detail herein with respect to FIGS. 1, 2, and 4.

FIGS. 4A-4D (collectively, "FIG. 4") are flow diagrams illustrating a method 400 for implementing automatic loop testing, in accordance with various embodiments. Method 400 of FIG. 4A continues onto FIG. 4B following the circular marker denoted, "A," and returns to FIG. 4A following the circular marker denoted, "B." Method 400 of FIG. 4A either continues onto FIG. 4C following the circular marker denoted, "C," or continues onto FIG. 4D following the circular marker denoted, "F." Method 400 of FIG. 4A continues onto FIG. 4D following the circular marker denoted, "D," and returns to FIG. 4A following the circular marker denoted, "E."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 310 of FIGS. 1, 2, and 3, respectively (or components thereof), such methods may also be implemented using any suitable hardware (or software) implementation. Similarly, while each of the systems, examples, or embodiments 100, 200, and 310 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 310 of FIGS. 1, 2, and 3 can each also operate according to other modes of operation and/or perform other suitable procedures.

Figure 4A:
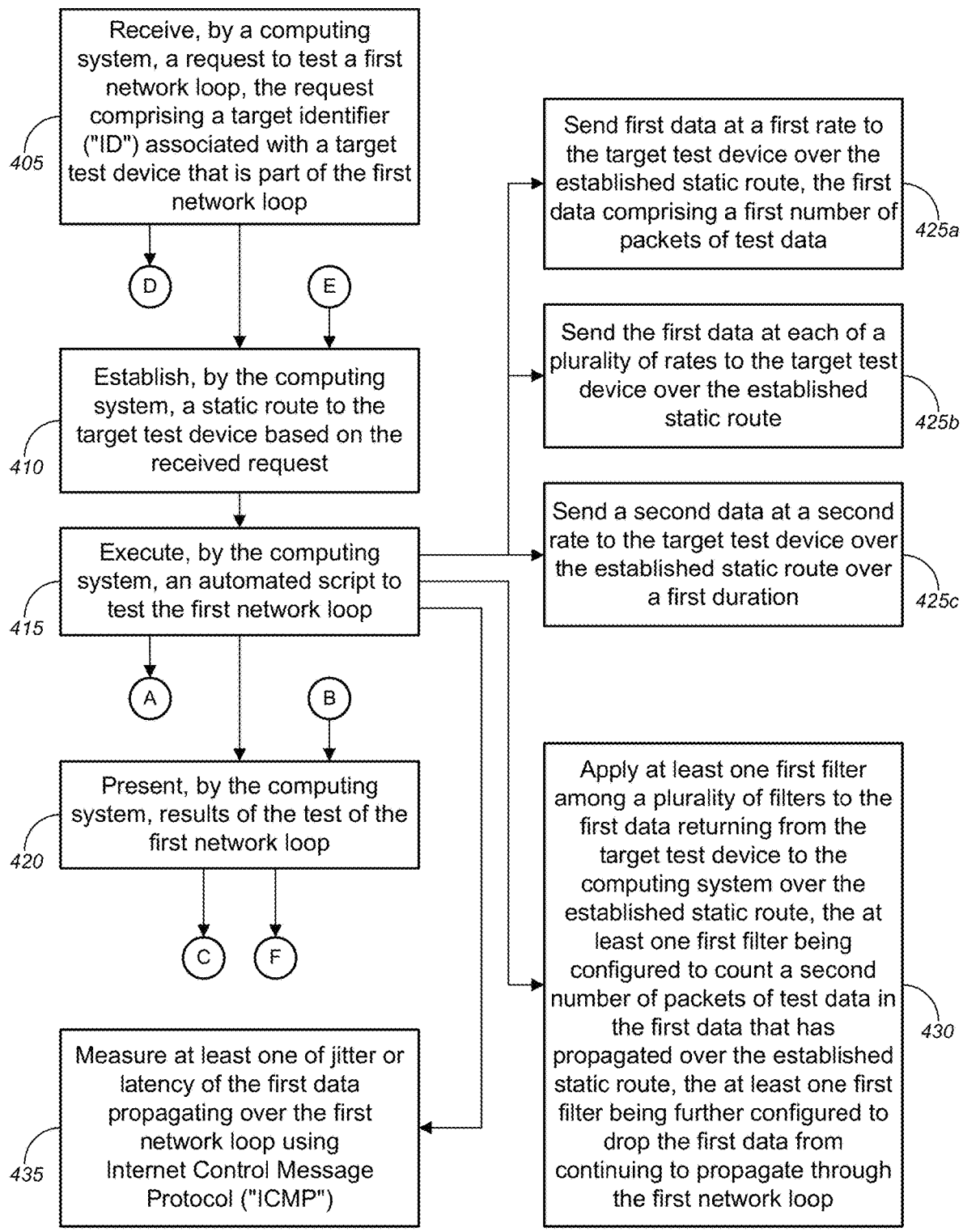
FIGS. 4A-4D are flow diagrams illustrating a method for implementing automatic loop testing, in accordance with various embodiments.

In the non-limiting embodiment of FIG. 4A, method 400, at block 405, may comprise receiving, by a computing system, a request to test a first network loop, the request comprising a target identifier ("ID") associated with a target test device that is part of the first network loop. In some embodiments, the computing system may include, without limitation, at least one of a server, a network edge device, or an automated loop testing device, and/or the like. In some examples, method 400 may continue from the process at block 405 onto the process at block 410. In other examples, method 400 may continue onto the process at block 470 in FIG. 4D following the circular marker denoted, "D," before returning to the process at block 410 in FIG. 4A, as indicated by the circular marker denoted, "E."

At block 410, method 400 may comprise establishing, by the computing system, a static route to the target test device based on the received request, the established static route comprising the first network loop from the computing system to the target test device and back to the computing system.

Method 400 may further comprise, at block 415, executing, by the computing system, an automated script to test the first network loop. According to some embodiments, the automated script, when executed, may cause the computing system to perform at least one of: sending first data at a first rate to the target test device over the established static route, the first data comprising a first number of packets of test data (block 425*a*); sending the first data at each of a plurality of rates to the target test device over the established static route (block 425*b*); and/or sending a second data at a second rate to the target test device over the established static route over a first duration (block 425*c*), the second data including a third number of packets of test data, the first duration being one of predetermined or selectable by a user, the first duration being longer than a duration over which the first data is sent to the target test device; and/or the like. In some instances, the automated script, when executed, may further cause the computing system to perform one or more of: applying at least one first filter among a plurality of filters to the first data returning from the target test device to the computing system over the established static route, the at least one first filter being configured to count a second number of packets of test data in the first data that has propagated over the established static route, the at least one first filter being further configured to drop (or to otherwise prevent) the first data from continuing to propagate through the first network loop (block 430); and/or measuring at least one of jitter or latency of the first data propagating over the first network loop using Internet Control Message Protocol ("ICMP") (block 435); and/or the like.

In some examples, method 400 may continue from the process at block 415 onto the process at block 420. In other examples, method 400 may continue onto the process at block 440 in FIG. 4B following the circular marker denoted, "A," before returning to the process at block 420 in FIG. 4A, as indicated by the circular marker denoted, "B." At block 420, method 400 may comprise presenting, by the computing system, results of the test of the first network loop. In some examples, method 400 may continue from the process at block 420 onto the process at block 460 in FIG. 4C following the circular marker denoted, "C." Alternatively, or additionally, method 400 may continue from the process at block 420 onto the process at block 490 in FIG. 4D following the circular marker denoted, "F."

Figure 4B:
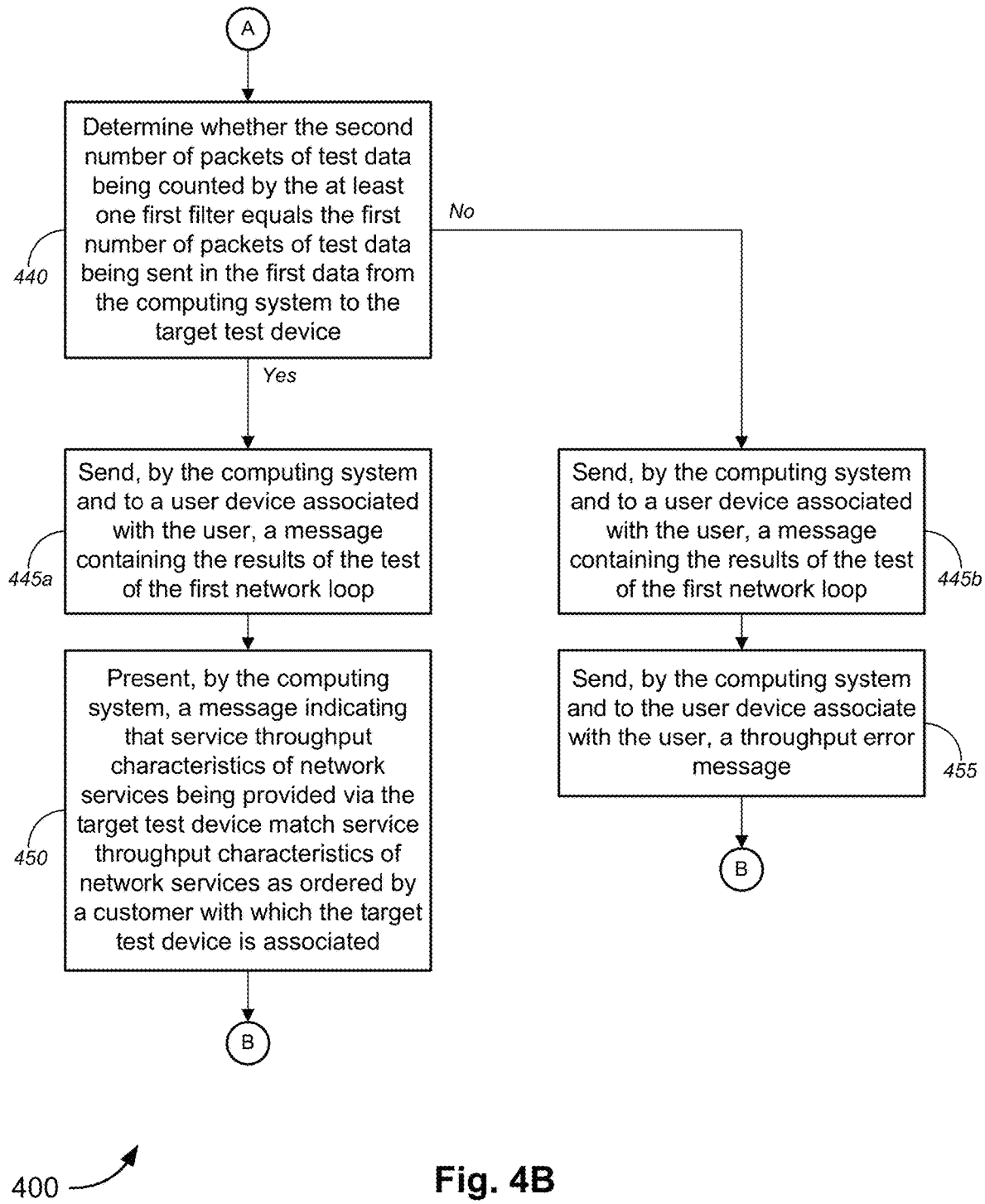

At block 440 in FIG. 4B (following the circular marker denoted, "A," in FIG. 4A), method 400 may comprise determining whether the second number of packets of test data being counted by the at least one first filter equals the first number of packets of test data being sent in the first data from the computing system to the target test device. If so, method 400 may continue onto the process at block 445*a*. If not, method 400 may continue onto the process at block 445*b*.

At block 445*a*, method 400 may comprise sending, by the computing system and to a user device associated with the user, a message containing the results of the test of the first network loop (in this case, that the second number of packets of test data being counted by the at least one first filter equals the first number of packets of test data being sent in the first data from the computing system to the target test device, or the like). Method 400 may further comprise presenting, by the computing system and within the UI, a message indicating that service throughput characteristics of network services being provided via the target test device match service throughput characteristics of network services as ordered by a customer with which the target test device is associated (block 450). Method 400 may return to the process at block 420 in FIG. 4A following the circular marker denoted, "B."

At block 445*b*, method 400 may comprise sending, by the computing system and to a user device associated with the user, a message containing the results of the test of the first network loop (in this case, that the second number of packets of test data being counted by the at least one first filter is less than the first number of packets of test data being sent in the first data from the computing system to the target test device, or the like). Method 400 may further comprise sending, by the computing system and to the user device associate with the user, a throughput error message (block 455). Method 400 may return to the process at block 420 in FIG. 4A following the circular marker denoted, "B."

Figure 4C:
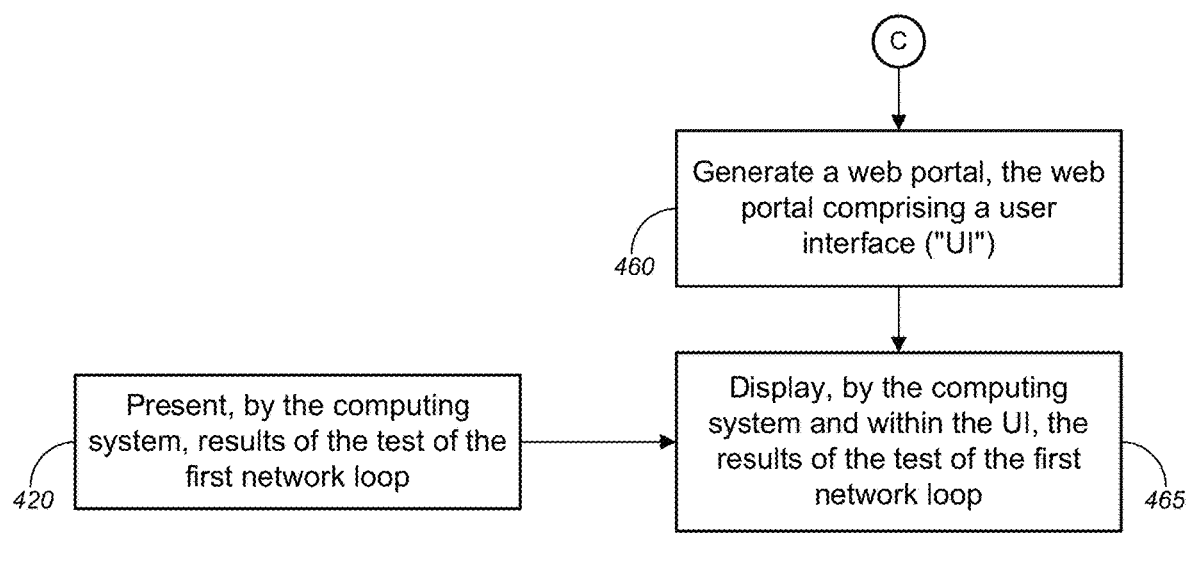

At block 460 in FIG. 4C (following the circular marker denoted, "C," in FIG. 4A), method 400 may comprise generating a web portal, the web portal comprising a user interface ("UI"). In some cases, the UI may be accessible over a network by a user. In some embodiments, receiving the request to test the first network loop (at block 405) may comprise receiving, by the computing system and from the UI, the request to test the first network loop. According to some embodiments, method 400 may continue onto the process at block 465. As shown in FIG. 4C, in some cases, presenting results of the test of the first network loop (at block 420) may comprise displaying, by the computing system and within the UI, the results of the test of the first network loop (block 465).

According to some embodiments, the UI may include, but is not limited to, one or more options that are selectable by the user. In some instances, the one or more options may include, without limitation, at least one of: an option to run the test of the first network loop in background mode; an option to one or more schedule tests of the first network loop; an option to schedule periodic tests of the first network loop; an option to run a test of a second network loop that is different from the first network loop; an option to run the test of the second network loop in background mode; an option to one or more schedule tests of the second network loop; or an option to schedule periodic tests of the second network loop; and/or the like.

Figure 4D:
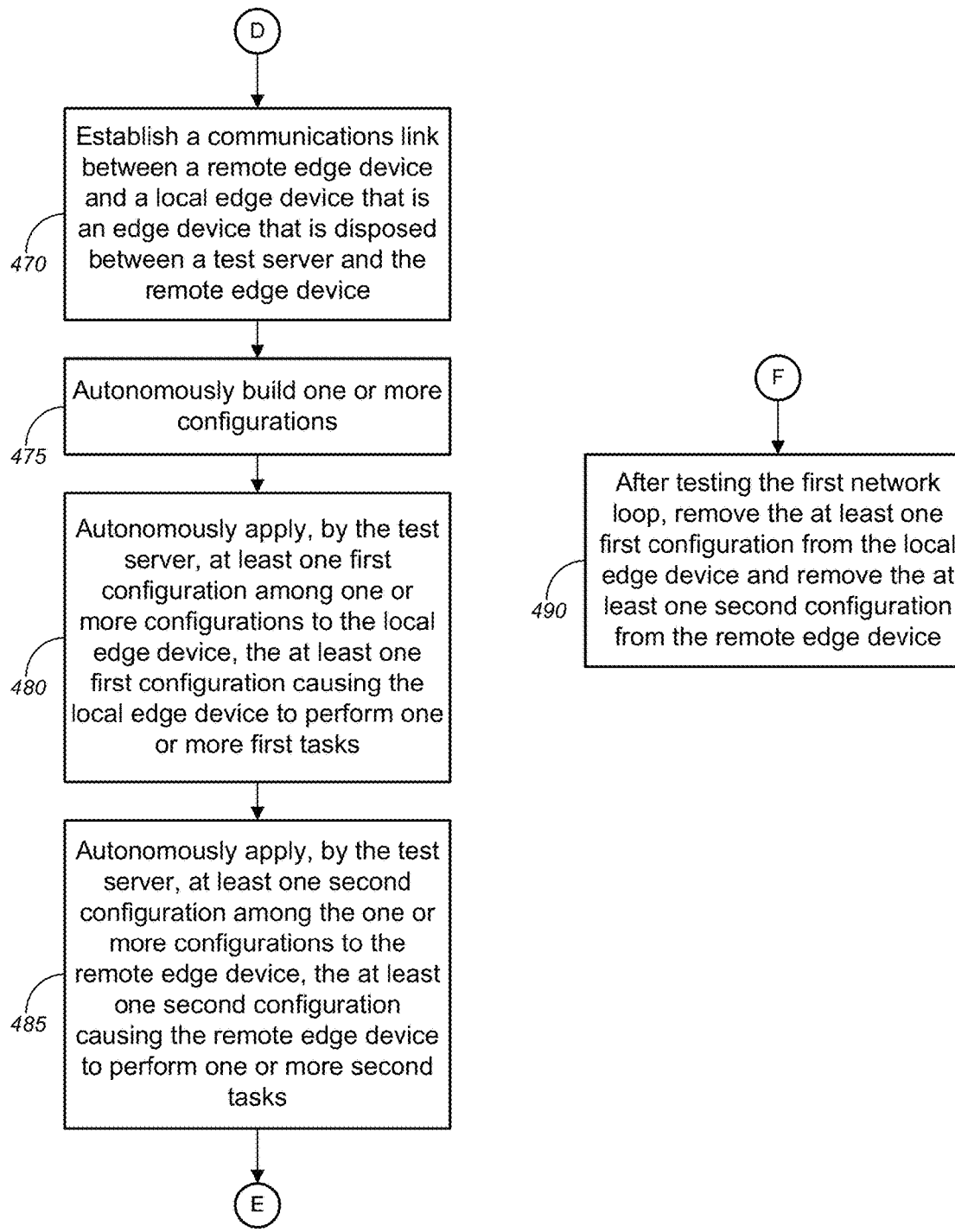

At block 470 in FIG. 4D (following the circular marker denoted, "D," in FIG. 4A), method 400 may comprise establishing a communications link between a remote edge device and a local edge device that is an edge device that is disposed between a test server and the remote edge device. In such cases, the communications link may include, without limitation, a multiprotocol label switching ("MPLS") routing link, or the like. At block 475, method 400 may comprise autonomously building one or more configurations. Method 400 may further comprise, at block 480, autonomously applying, by the test server, at least one first configuration among the one or more configurations to the local edge device, the at least one first configuration causing the local edge device to perform one or more first tasks. At block 485, method 400 may comprise autonomously applying, by the test server, at least one second configuration among the one or more configurations to the remote edge device, the at least one second configuration causing the remote edge device to perform one or more second tasks.

In some instances, each of the one or more first tasks and the one or more second tasks may include, but is not limited to, at least one of: running tests on one of the local edge device or the remote edge device; running tests of network loops communicatively coupled to at least one of the local edge device or the remote edge device; determining whether a hop from one network segment to another network segment between the test server and the remote edge device is reachable, unreachable, or obstructed; determining whether a hop from one network segment to another network segment along the first network loop is reachable, unreachable, or obstructed; or determining which one or more filters among the plurality of filters to apply to the first data; and/or the like.

Method 400 may return to the process at block 410 in FIG. 4A following the circular marker denoted, "E."

At block 490 in FIG. 4D (following the circular marker denoted, "F," in FIG. 4A), method 400 may comprise, after testing the first network loop, removing the at least one first configuration from the local edge device and removing the at least one second configuration from the remote edge device.

Exemplary System and Hardware Implementation

Figure 5:
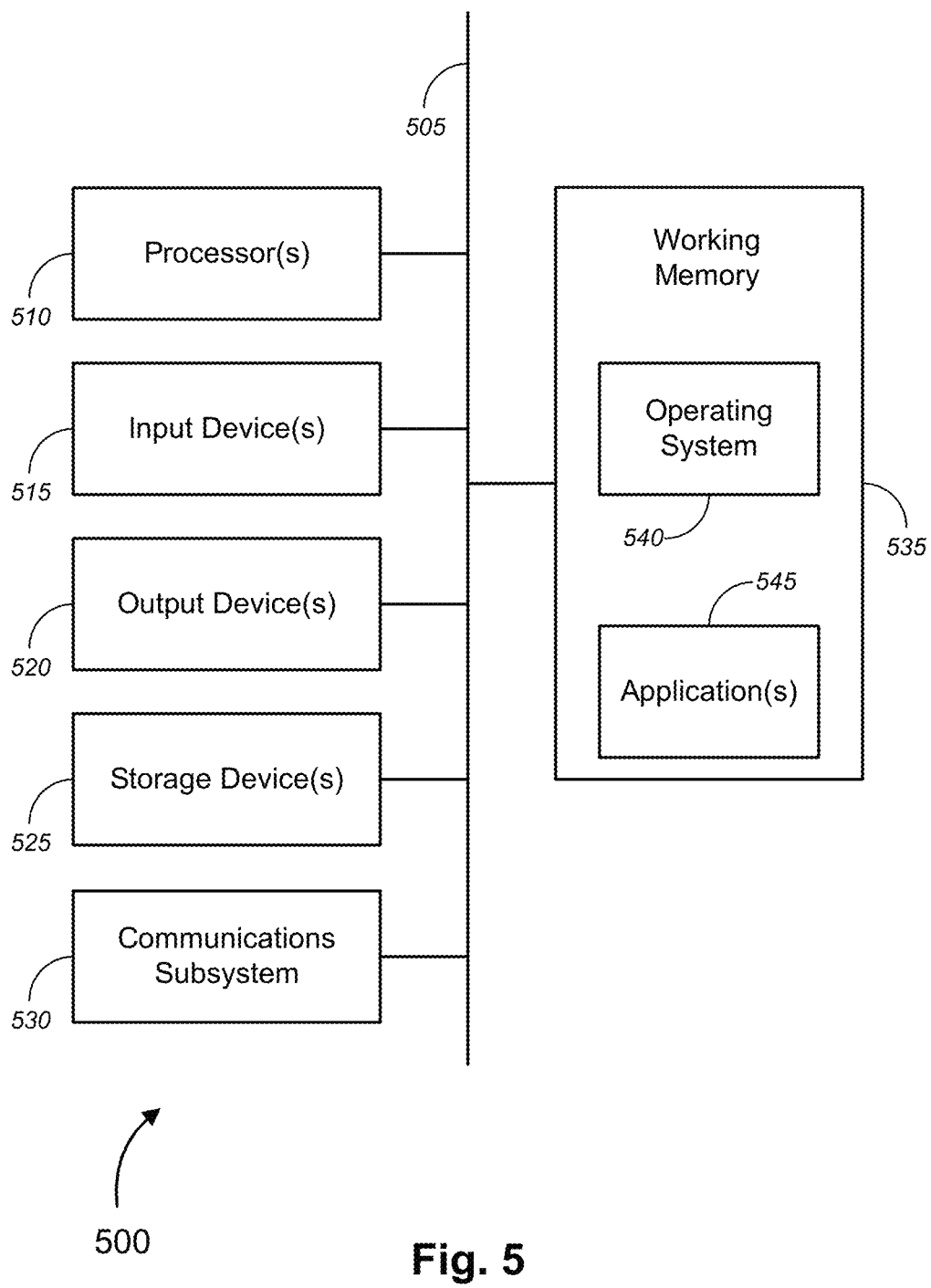
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., server(s) 105 and 205, edge devices 115*a*-115*f*, 215*a*, and 215*b*, target test devices 125*a*-125*n* and 225, local exchange carrier ("LEC") equipment 130*a*-130*c* and 230, and user devices 145 and 305, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., server(s) 105 and 205, edge devices 115*a*-115*f*, 215*a*, and 215*b*, target test devices 125*a*-125*n* and 225, LEC equipment 130*a*-130*c* and 230, and user devices 145 and 305, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, by a computing system, a request to test a first network loop, the request comprising a target identifier ("ID") associated with a target test device that is part of the first network loop;
   establishing, by the computing system, a static route to the target test device based on the received request, the established static route comprising the first network loop from the computing system to the target test device and back to the computing system;
   executing, by the computing system, an automated script to test the first network loop, wherein the automated script, when executed, causes the computing system to:
      send first data at a first rate to the target test device over the established static route, the first data comprising a first number of packets of test data; and
      apply at least one first filter among a plurality of filters to the first data returning from the target test device to the computing system over the established static route, the at least one first filter being configured to count a second number of packets of test data in the first data that has propagated over the established static route, the at least one first filter being further configured to drop the first data from continuing to propagate through the first network loop; and
   based on a determination that the second number of packets of test data being counted by the at least one first filter is less than the first number of packets of test data being sent in the first data from the computing system to the target test device, presenting, by the computing system, results of the test of the first network loop.

2. The method of claim 1, wherein the computing system comprises at least one of a server, a network edge device, or an automated loop testing device.

3. The method of claim 1, wherein the automated script, when executed, further causes the computing system to perform at least one of:
   sending the first data at each of a plurality of rates to the target test device over the established static route; or
   sending a second data at a second rate to the target test device over the established static route over a first duration, the second data comprising a third number of packets of test data, the first duration being one of predetermined or selectable by a user, the first duration being longer than a duration over which the first data is sent to the target test device.

4. The method of claim 1, wherein the automated script, when executed, further causes the computing system to:
   measure at least one of jitter or latency of the first data propagating over the first network loop using Internet Control Message Protocol ("ICMP").

5. The method of claim 1, further comprising:
   generating a web portal, the web portal comprising a user interface ("UI"), wherein the UI is accessible over a network by a user, wherein receiving the request to test the first network loop comprises receiving, by the computing system and from the UI, the request to test the first network loop.

6. The method of claim 5, wherein the UI comprises one or more options that are selectable by the user, wherein the one or more options comprise at least one of:
   an option to run the test of the first network loop in background mode;
   an option to one or more schedule tests of the first network loop;
   an option to schedule periodic tests of the first network loop;
   an option to run a test of a second network loop that is different from the first network loop;
   an option to run the test of the second network loop in background mode;
   an option to one or more schedule tests of the second network loop; or
   an option to schedule periodic tests of the second network loop.

7. The method of claim 5, wherein presenting results of the test of the first network loop comprises at least one of:
   displaying, by the computing system and within the UI, the results of the test of the first network loop;
   sending, by the computing system and to a user device associated with the user, a message containing the results of the test of the first network loop; or
   sending, by the computing system and to the user device associate with the user, a throughput error message.

8. The method of claim 5, further comprising:
based on a determination that the second number of packets of test data being counted by the at least one first filter equals the first number of packets of test data being sent in the first data from the computing system to the target test device, performing at least one of:
presenting, by the computing system, results of the test of the first network loop;
displaying, by the computing system and within the UI, the results of the test of the first network loop;
sending, by the computing system and to a user device associated with the user, a message containing the results of the test of the first network loop; or
presenting, by the computing system and within the UI, a message indicating that service throughput characteristics of network services being provided via the target test device match service throughput characteristics of network services as ordered by a customer with which the target test device is associated.

9. The method of claim 1, wherein the computing system comprises a remote edge device, wherein the first data is generated by a test server, wherein the method further comprises:
autonomously applying, by the test server, at least one first configuration among one or more configurations, which have been autonomously built, to a local edge device that is an edge device between the test server and the remote edge device, the at least one first configuration causing the local edge device to perform one or more first tasks; and
autonomously applying, by the test server, at least one second configuration among the one or more configurations to the remote edge device, the at least one second configuration causing the remote edge device to perform one or more second tasks.

10. The method of claim 9, further comprising:
establishing a communications link between the remote edge device and the local edge device, wherein the communications link comprises a multiprotocol label switching ("MPLS") routing link.

11. The method of claim 9, wherein each of the one or more first tasks and the one or more second tasks comprises at least one of:
running tests on one of the local edge device or the remote edge device;
running tests of network loops communicatively coupled to at least one of the local edge device or the remote edge device;
determining whether a hop from one network segment to another network segment between the test server and the remote edge device is reachable, unreachable, or obstructed;
determining whether a hop from one network segment to another network segment along the first network loop is reachable, unreachable, or obstructed; or
determining which one or more filters among the plurality of filters to apply to the first data.

12. The method of claim 9, further comprising:
after testing the first network loop, removing the at least one first configuration from the local edge device and removing the at least one second configuration from the remote edge device.

13. The method of claim 1, wherein the test data comprises a packet capture ("pcap") data file, wherein sending the first data comprises sending a first number of packets of the pcap data file at the first rate to the target test device over the established static route using user datagram protocol ("UDP").

14. The method of claim 1, wherein the test data comprises a packet capture ("pcap") data file of a transmission control protocol ("TCP") data stream, wherein sending the first data comprises sending a first number of packets of the pcap data file of the TCP data stream at the first rate to the target test device over the established static route.

15. The method of claim 1, wherein the target test device comprises a customer premises equipment ("CPE"), wherein the established static route further comprises one or more local exchange carrier ("LEC") equipment along the first network loop.

16. The method of claim 15, wherein, in response to being initialized, the CPE sends, to the computing system, the request to test the first network loop, wherein presenting the results of the test of the first network loop comprises presenting, by the computing system and to a user interface ("UI") of one of a web portal accessible to a user or a user device associated with the user, results of the test of the first network loop.

17. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive a request to test a first network loop, the request comprising a target identifier ("ID") associated with a target test device that is part of the first network loop;
establish a static route to the target test device based on the received request, the established static route comprising the first network loop from the computing system to the target test device and back to the computing system;
execute an automated script to test the first network loop, wherein the automated script, when executed, causes the computing system to:
send first data at a first rate to the target test device over the established static route, the first data comprising a first number of packets of test data; and
apply at least one first filter among a plurality of filters to the first data returning from the target test device to the computing system over the established static route, the at least one first filter being configured to count a second number of packets of test data in the first data that has propagated over the established static route, the at least one first filter being further configured to drop the first data from continuing to propagate through the first network loop; and
based on a determination that the second number of packets of test data being counted by the at least one first filter is less than the first number of packets of test data being sent in the first data from the computing system to the target test device, present results of the test of the first network loop.

18. The system of claim 17, wherein the computing system comprises at least one of a server, a network edge device, or an automated loop testing device.

19. A method, comprising:
receiving, by a test server or a remote edge device and from one of a target test device or a user via a user interface ("UI"), a request to test a first network loop, the request comprising a target identifier ("ID") associated with a target test device that is part of the first network loop;
autonomously applying, by a test server, at least one first configuration among one or more configurations, which have been autonomously built, to a local edge device that is an edge device between the test server and the remote edge device, the at least one first configuration causing the local edge device to perform one or more first tasks;
autonomously applying, by the test server, at least one second configuration among the one or more configurations to the remote edge device, the at least one second configuration causing the remote edge device to perform one or more second tasks;
establishing, by the test server or the remote edge device, a static route to the target test device based on the received request, the established static route comprising the first network loop from the remote edge device to the target test device and back to the remote edge device;
executing, by the test server or the remote edge device, an automated script to test the first network loop, wherein the automated script, when executed, causes the test server or the remote edge device to:
send first data at a first rate to the target test device over the established static route, the first data comprising a first number of packets of test data; and
apply at least one first filter among a plurality of filters to the first data returning from the target test device to the remote edge device over the established static route, the at least one first filter being configured to count a second number of packets of test data in the first data that has propagated over the established static route, the at least one first filter being further configured to drop the first data from continuing to propagate through the first network loop; and
based on a determination that the second number of packets of test data being counted by the at least one first filter is less than the first number of packets of test data being sent in the first data from the remote edge device to the target test device, presenting, by the test server or the remote edge device and to the user via the UI, results of the test of the first network loop.

20. The method of claim 19, wherein each of the one or more first tasks and the one or more second tasks comprises at least one of:
running tests on one of the local edge device or the remote edge device;
running tests of network loops communicatively coupled to at least one of the local edge device or the remote edge device;
determining whether a hop from one network segment to another network segment between the test server and the remote edge device is reachable, unreachable, or obstructed;
determining whether a hop from one network segment to another network segment along the first network loop is reachable, unreachable, or obstructed; or
determining which one or more filters among the plurality of filters to apply to the first data.

\* \* \* \* \*